United States Patent
Agiwal

(10) Patent No.: US 7,877,750 B2
(45) Date of Patent: Jan. 25, 2011

(54) SCHEDULED JOB EXECUTION MANAGEMENT

(75) Inventor: Uttam Agiwal, Jamshedpur (IN)

(73) Assignee: SAP AG, Walldorf (DE)

( * ) Notice: Subject to any disclaimer, the term of this patent is extended or adjusted under 35 U.S.C. 154(b) by 1581 days.

(21) Appl. No.: 11/191,692

(22) Filed: Jul. 27, 2005

(65) Prior Publication Data

US 2007/0028241 A1  Feb. 1, 2007

(51) Int. Cl.
*G06F 9/46* (2006.01)
*G06F 15/16* (2006.01)

(52) U.S. Cl. .................. 718/102; 718/101; 709/201; 709/202

(58) Field of Classification Search ......... 718/100–102, 718/103; 717/175, 176, 177, 178; 709/201–202
See application file for complete search history.

(56) References Cited

U.S. PATENT DOCUMENTS

| | | | | |
|---|---|---|---|---|
| 5,202,989 A * | 4/1993 | Hirosawa et al. | ............ | 718/105 |
| 5,381,347 A * | 1/1995 | Gery | ............ | 345/548 |
| 5,893,905 A * | 4/1999 | Main et al. | ............ | 705/11 |
| 6,247,047 B1 * | 6/2001 | Wolff | ............ | 709/219 |
| 6,363,472 B1 * | 3/2002 | Linnermark | ............ | 712/36 |
| 6,625,636 B1 * | 9/2003 | Skovira | ............ | 718/102 |
| 6,671,871 B2 * | 12/2003 | Utsumi | ............ | 717/101 |
| 7,136,178 B1 * | 11/2006 | Gupta et al. | ............ | 358/1.15 |
| 7,266,821 B2 * | 9/2007 | Polizzi et al. | ............ | 718/100 |
| 7,546,323 B1 * | 6/2009 | Timmins et al. | ............ | 1/1 |
| 7,577,667 B2 * | 8/2009 | Hinshaw et al. | ............ | 1/1 |
| 2002/0023122 A1 * | 2/2002 | Polizzi et al. | ............ | 709/202 |
| 2004/0237087 A1 * | 11/2004 | Ye et al. | ............ | 718/101 |
| 2005/0071843 A1 * | 3/2005 | Guo et al. | ............ | 718/101 |
| 2005/0081200 A1 * | 4/2005 | Rutten et al. | ............ | 718/100 |
| 2005/0216884 A1 * | 9/2005 | Tchochiev | ............ | 717/106 |
| 2005/0223384 A1 * | 10/2005 | Klingman | ............ | 718/107 |
| 2005/0268300 A1 * | 12/2005 | Lamb et al. | ............ | 718/100 |
| 2006/0107264 A1 * | 5/2006 | Schmidt et al. | ............ | 718/100 |
| 2006/0184944 A1 * | 8/2006 | Schwerk | ............ | 718/101 |
| 2008/0229318 A1 * | 9/2008 | Franke | ............ | 718/104 |

\* cited by examiner

*Primary Examiner*—Chat C Do
*Assistant Examiner*—Jennifer N To
(74) *Attorney, Agent, or Firm*—Kenyon & Kenyon LLP

(57) ABSTRACT

Scheduled jobs can be managed by monitoring the veracity of the data sets processed by these jobs. A multi-processing environment includes remote processing devices generating the data sets. A central processing device executes scheduled job, also known as batch processes, using the data sets. For each of the scheduled jobs, a scheduled job management device tracks the data set generated by the remote processing devices. Through tracking these data sets, the execution of the scheduled jobs may be managed. If one or more of the data sets are not the proper data for the scheduled job, the management device may thereupon control the execution of the job. Through the utilization of the management device, the execution of improper scheduled jobs may be avoided.

14 Claims, 4 Drawing Sheets

SCHEDULED JOB EXECUTION MANAGEMENT

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to the execution of scheduled jobs and more specifically to the management of the automated execution of scheduled jobs.

In existing systems that execute scheduled jobs, these jobs are commonly referred to as batch processes. In some UNIX processing environments, these scheduled jobs are also referred to as chron jobs. These batch processes are typically executed at off-times when processing requirements for a main system are reduced. For example, batch processes may be performed during late nighttime and early morning hours when system users are not accessing a central processing system. Therefore, the processing system may readily dedicate the needed processing resources for completing the batch processes or scheduled jobs.

Increased computing resources and system efficiencies have reduced the time-sensitive nature of batch processing. While many batch processes are run during off-peak hours, the timing of these processes are typically currently dictated by other means, such as the availability and time-sensitivity of the data being processed. For example, a batch process might be running a month-end report including billing information for multiple clients or customers. The scheduled execution of the job is based on the timing of the billing information being received in the processing system. In this example, the job is scheduled based on a reasonable determination of when the requisite billing information is available from the billing system.

Scheduled jobs are also complicated by the increased complexity of multiple processing systems. When a processing environment includes one or more processing systems capable of running the batch processes and multiple ancillary systems that provide the data for these jobs, problems can arise. If there is an error with any one of the multiple different processing systems in the processing environment, this may make the batch process incorrect. In addition to problems or errors in the ancillary system, there may also be concerns that these ancillary systems do not yet have complete and proper data sets, e.g. not all the requisite information in compiled yet. For example, if the batch process includes multiple invoices and one billing system does not have current invoice data, the scheduled job will run an improper report. In fact, the scheduled job will most likely have to be re-executed when the missing data is properly assembled or compiled. Improperly running scheduled job is not only extremely inefficient, but a significant waste of processing resources.

As the number of interdependent systems increases, there are also other concerns besides the integrity of the data used for the scheduled job. For example, if one system goes down for any reason, that may cause significant disruptions in the complete processing environment for one or more scheduled jobs, including further scheduled jobs that are dependent upon the generated data of previous jobs. As multi-processing environments globally interconnect, the potential for confusion in scheduled jobs increases.

In current processing systems, scheduled jobs are either executed or cancelled. There does not exist any system for managing these scheduled jobs, where the management includes monitoring the veracity of the data used for the job. If a job is scheduled for a predetermined time, that job is then executed at said time. Should there be concerns about the integrity of the data processing in the schedule job, a user must manually over-ride a job scheduling system to terminate the job. Another option is that a user may manually reset an execution time for a particular job, but this requires resetting the defined execution time for the job. When this occurs, a user must thereupon reset the job execution time back to its original time after the job is executed.

Although, in current processing systems, there does not exist indicators as the veracity of the data being processed. Rather, these systems merely assume the data is correct. If there is problem with a system, the user must be notified manually and must manually intercept the timed-execution of the scheduled job. For example, with multiple processing systems in multi-processing environments, there is no known mechanism for notifying the user that one or more data sets are not the proper data. For example, if one of the systems goes down, the batch processing system is unaware of having inaccurate data for the subsequent scheduled job. When data is retrieved from multiple systems, the batch process simply retrieves and processes the information, assuming the information is current and correct. As noted above, in the event one or more systems do not provide the proper data, the batch process is still executed, generating improper results and the job must be re-executed.

DETAILED DESCRIPTION

Scheduled jobs can be managed by monitoring the timeliness of the data sets processed by these jobs. A multi-processing environment includes remote processing devices generating the data sets. These remote processing devices may be different processing systems, such as enterprise resource planning (ERP) systems, customer relations management (CRM) systems or any other system capable of generating data.

A central processing device may be any processing environment providing for the execution of scheduled jobs. As described above, scheduled jobs, also known as batch processes, are usually performed at off-peak processing times and utilize one or more data sets. Typically, these data sets are generated by the remote processing devices and provided to the central processing device. In a typical multi-system environment, the remote processing devices communicate with the central processing device across one or more networks in accordance with known network interfacing techniques.

For each of the scheduled jobs, a scheduled job management device tracks the data set generated by the remote processing devices. Through tracking these data sets, the execution of the scheduled jobs may be managed. If one or more of the data sets are not the proper data for the scheduled job, the management device may thereupon control the execution of the job, for example delaying the job until the proper data set(s) are received by the processing device. Generally, through the utilization of the management device, the execution of improper scheduled jobs can be avoided.

Figures 1, 2:
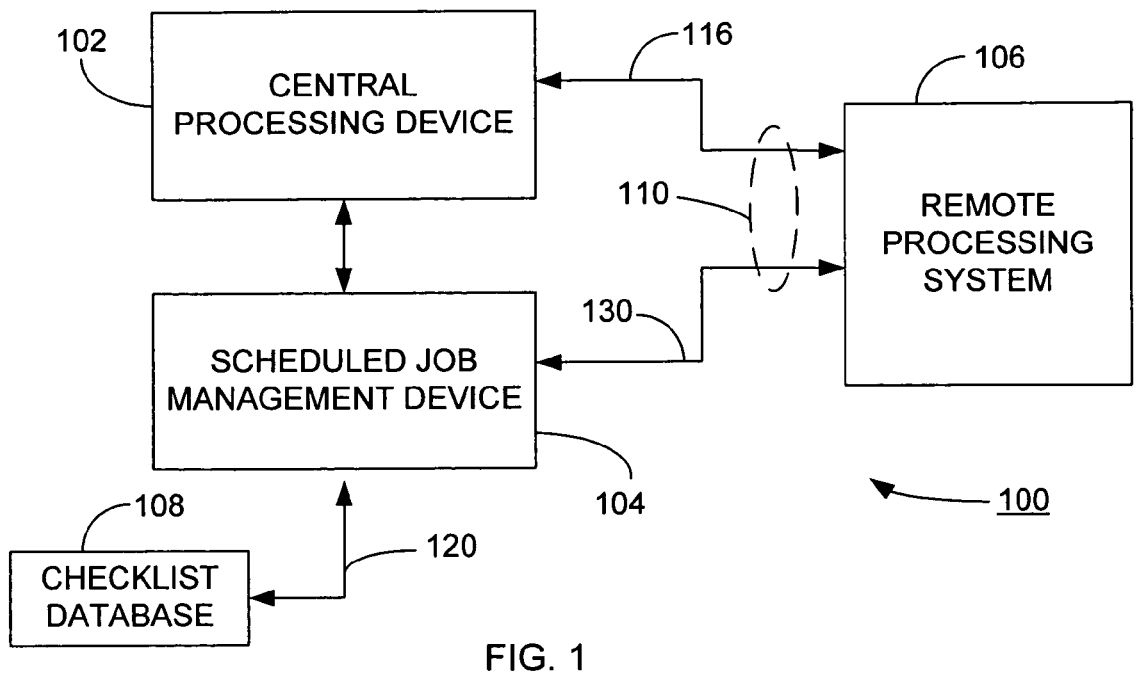
FIG. 1 illustrates a block diagram of one embodiment of a system for managing the execution of scheduled jobs.
FIG. 2 illustrates a graphical representation of a checklist utilized in one embodiment for the management of the execution of scheduled jobs.

FIG. 1 illustrates one embodiment of a system 100 for managing scheduled jobs. The system 100 includes a central processing device 102, a scheduled job management device 104 and a remote processing system 106. Coupled to the management device 104 is a checklist database 108 having one or more checklists associated with the scheduled jobs managed by the management device 104.

The central processing device 102 and management device 104 may be in operative communication with the remote processing system 106 across a network, shown generally at 110. In one embodiment, the processing system 106 may communicate with the processing device 102 through the management device 104 or with the management device 104 through the processing device 102. Although, in the embodiment illustrated in FIG. 1, the processing system 106 communicates with both the processing device 102 and the management device 104.

The embodiment of the present invention find applications with a wide variety of data sets and a wide variety of jobs. For example, if the remote processing system 106 is a billing system, the data set may be data related to current invoices, including product inventory, sales figures and customer credit accounts. The remote processing system 106 may generate different data sets for different scheduled jobs or may generate a single data set that may be used by one or more scheduled jobs.

These scheduled jobs are executed in the central processing device 102. The executions of the scheduled jobs are performed in accordance with known standard scheduled job execution techniques. Although, as described above, scheduled jobs are executed at specific predetermined times. The job is executed using the resident data set or may be executed in response to a data retrieval request. For example, if a data retrieval request is utilized and the retrieved data set is not the most current data set 116, the scheduled job may need to be re-executed.

The scheduled job management device 104 retrieves a checklist 120 from the checklist database 108. FIG. 2 illustrates a representative example of a checklist for a scheduled job, herein noted Schedule Job No. X 122. The checklist 120 includes a first column 124 relating to the data sets and a second column 126 having an indicator as to the status of the data sets.

The management device 104 may use the checklist 120 to track the status of the data sets. For example, if job number X utilizes four different data sets, the checklist 120 may track the status of these four different data sets. In one application, the scheduled job may be directed to a billing system, where the first data set is customer information, the second data set is invoice information, the third data set is credit information and the fourth data set may be invoice mailing addresses. Since the scheduled job should be performed on the most current information in the data sets, the checklist 120 monitors if the data set is the most current data set for the scheduled job.

In one embodiment, the remote processing system 106 may transmit a status indicator 130 to the management device 104. In another embodiment, the management device 104 may query the remote processing system 106 regarding the status of the data sets. In another embodiment, the management device 104 may track the status of the data sets through the central processing device 102, such as transmitting a query request therethrough, receiving a status indicator from the central processing job 102, monitoring the timeliness of the data sets 116 received from the remote processing system 106 or any other suitable technique as recognized by one having ordinary skill in the art.

In one embodiment, the status indicator 130 may provide an indication that the remote processing system 106 has generated the current data set properly. For example, in the above example of a billing scheduled job, the remote system 106 may generate a status indicator 130 when all invoice information has been entered and released into the remote system. The processing system 106 may then run an end-of-the-month or other time-based compilation routine on the data to generate the data set that is subsequently used for the scheduled job. The status indicator 130 may indicate that the data set has been properly generated for this time period.

Also illustrated in FIG. 1, the management device 104 and the central processing device 102 may be in direct communication. In one embodiment, the devices 102 and 104 may be disposed in a single processing environment, wherein the management device 104 may be a software module implemented within the central processing device 102, an ASIC coupled to the processing device 102 or any other suitable orientation allowing for the management of the scheduled jobs.

The management device 104 manages the scheduled jobs by tracking the status of the data sets relative to the corresponding jobs, based on the scheduled execution time for the jobs. If a job execution time is approaching, the management device 104 determines if the data sets are proper. If the data sets are the proper and have the current data, the scheduled job is executed in accordance with standard techniques.

In the event one of the data sets is improper, the management device 104 may delay the execution of the job. In one embodiment, the management device may send a notification command to an end user, such as an administrator. The notification command may provide for potential concerns about the pending scheduled job and any concerns over the accuracy of the data sets. The notification may also contain a time delay recommendation for the end user to delay the execution time of the job. For example, in one embodiment a status indicator 130 may indicate that one of the data sets will be available in 12 hours, therefore, the notification may recommend delaying the scheduled job for at least 12 hours to coordinate with the generation of updated data sets.

In one embodiment, the management device may delay execution of the job until a response is received from the notification. In another embodiment, a default response time may be set wherein if a response is not received by a certain time, the job may be executed or automatically delayed.

In the event the data sets are not proper for the scheduled job, the management device 104 may instruct the processing device 102 to not execute the scheduled job. This non-execution instruction may be in response to an instruction provided to the management device 104 from an end user, such as a system administrator or other user with administrative control. Therefore, the execution of the scheduled job is controlled by the management device 104 by tracking the status of the data sets 116.

Figure 3:
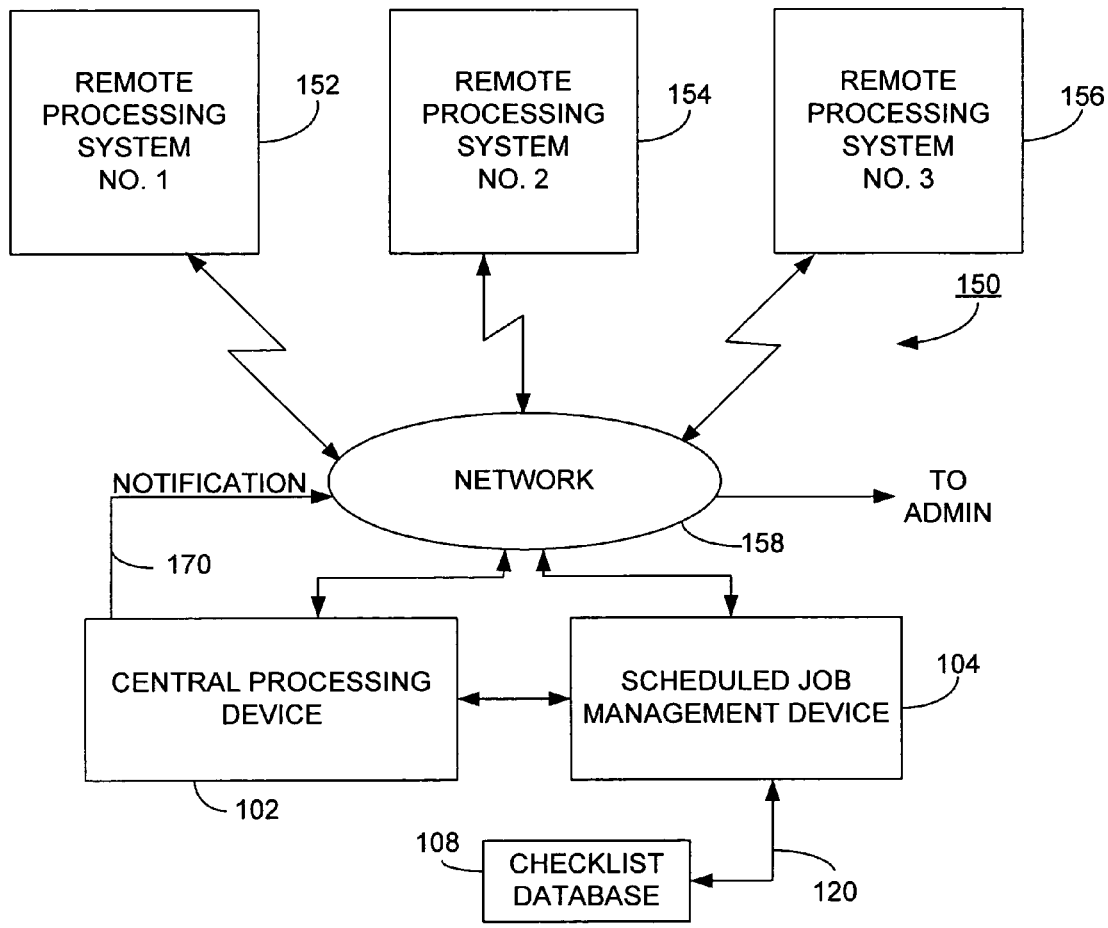
FIG. 3 illustrates a block diagram of another embodiment of a system for managing the execution of scheduled jobs.

FIG. 3 illustrates another embodiment of a system 150 that includes a first remote processing system 152, a second remote processing system 154 and a third remote processing system 156. The processing systems 152, 154 and 156 communicate with the central processing device 102 and the scheduled job management device 104 through a network 158. The system 150 may include any number of remote processing systems, where these systems provide data sets to the central processing device 102, such as through the network 158. The network 158 may be any suitable network or networks providing for communication thereacross.

Similar to the system of FIG. 1, the management device 104 utilizes one or more checklists 120 from the checklist database 108. With these checklists 120, the management device 104 monitors the status of the various data sets used by the central processing device. With multiple data sets generated by the different remote processing systems 152, 154 and 156, the management device 104 still monitors the status of the data sets relative to scheduled jobs. In this embodiment, the management device monitors multiple checklists with various data sets from various sources.

Figure 4:
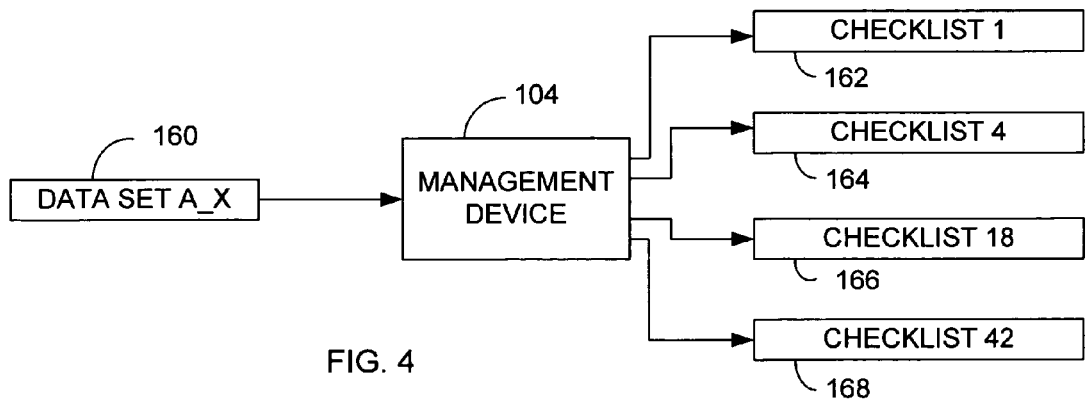
FIG. 4 illustrates a block diagram of the management of data sets for managing the execution of corresponding scheduled jobs.

FIG. 4 illustrates a graphical representation of one embodiment in which the management device 104 tracks the data sets. A status indicator 160 is received by the management device 104. This status indicator 160 may be received through the central processing device 102 or directly from one of the remote processing systems 152, 154 or 156 across the network 158. The status indicator 160 is related to data set A_X, which is for illustrative purposes only. In one embodiment, this status indicator may related to function "A" and generated by remote processing device "X," such as the function A is related to invoicing and X related to remote processing system 3.

The management device 104 receives the indicator 160 and coordinates this indicator with appropriate checklists. For example, if the management device 104 is monitoring 25 checklists associated with 25 different scheduled jobs, the management device 104 applies this status information to the appropriate checklists. For example, in FIG. 4 it is illustrated that four checklists utilize data set A_X, checklist 1 162, checklist 2 164, checklist 3 166 and checklist 4 168. Within an internal field in the checklist, the status of the corresponding data set is therein updated. For example, in FIG. 2, the status field in the second column 126 may be switched from "no" to "yes" if the status indicator 160 indicates the data set is properly generated for the scheduled jobs associated with checklists 162, 164, 166 and 168.

Similar to the system of FIG. 1, the management device 104 may generate a notification that can be provided to an administrator through the network 158. The notification may be transmitted through the processing device 102 (as illustrated in FIG. 3) or may be generated and transmitted directly from the management device. The notification may also be generated and/or transmitted using any other suitable means as recognized by one having ordinary skill in the art, such that an end user is notified of potential problems with the pending scheduled job.

Figure 5:
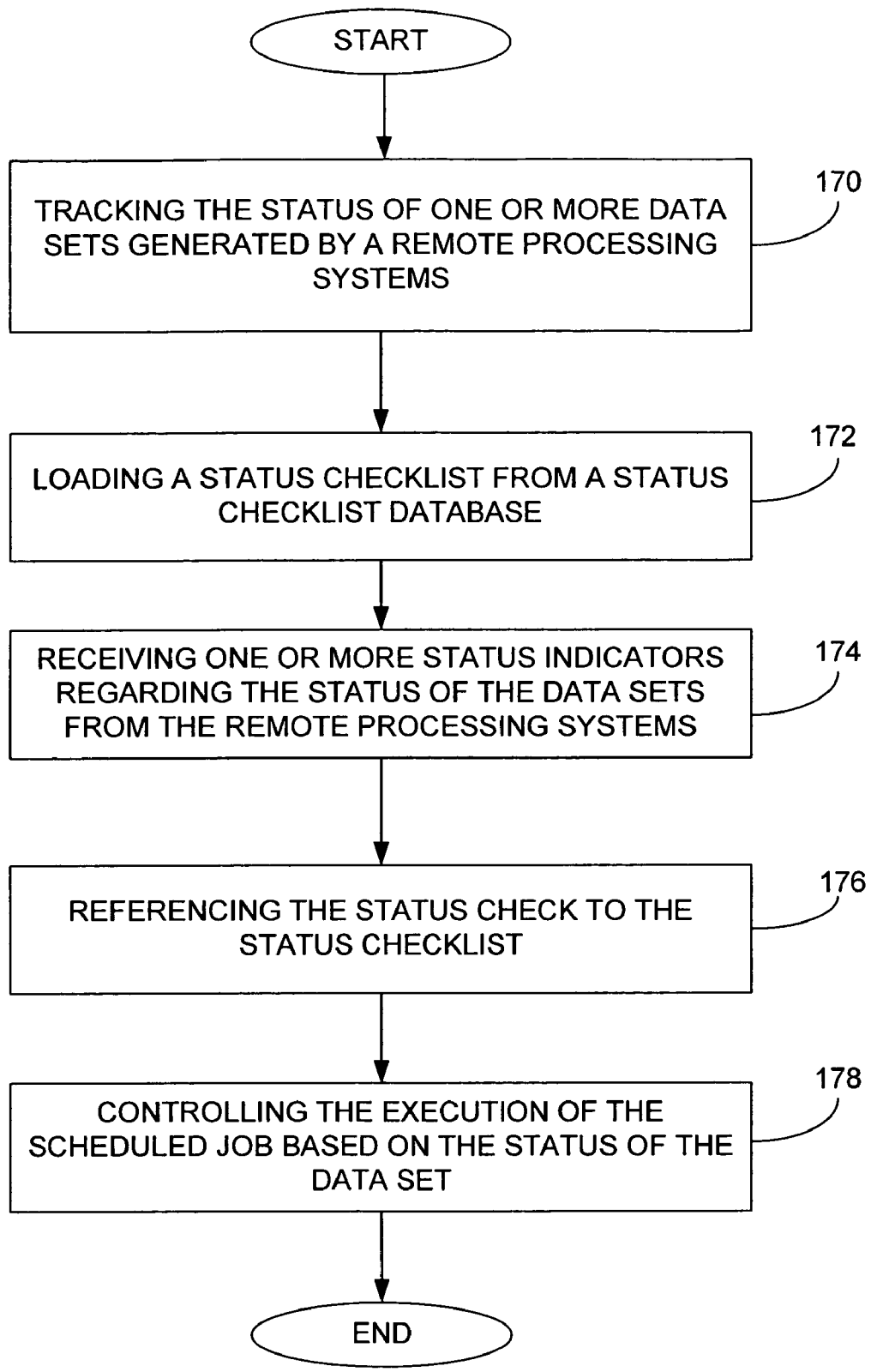
FIG. 5 illustrates the steps of one embodiment of a method for managing the execution of scheduled jobs.

FIG. 5 illustrates the steps of one embodiment of a method for managing scheduled jobs using remotely generated data sets. A computer-readable storage medium can include program instructions that, when executed, perform embodiments of the method. The method begins, step 170, by tracking the status of one or more data sets generated by a remote processing system. As discussed above with respect to FIG. 1, the remote processing system 106 generates data sets using internal operations, such as relationship database applications or other data management applications. These systems perform intended functions, but also generate usable data sets for batch process or scheduled job operations.

In this embodiment, the next step, step 172, is loading a status checklist from a status checklist database. This step may be performed by the scheduled job management device 104 accessing the checklist database 108 to retrieve a checklist 120. The checklist 120 is loaded into the management device 104. The next step, step 174, is receiving one or more status indicators regarding the status of the data sets from the remote processing systems. The status indicators, such as the indicator 160 of FIG. 4, may be received directly from the remote processing system 106, may be received through the central processing device 102 or may be in response to a status inquiry submitted to the remote processing system 106. In another embodiment, the status indicator may be also be generated based on time information or other status information for data sets received or stored within the central processing device prior to scheduled job execution.

The next step, step 176, is referencing the status indicator to the status checklist. Similar to FIG. 4, the checklist is updated based on this status information, providing an indication of accuracy of the data sets to be used for the corresponding scheduled job or jobs. The final step, step 178, is thereupon controlling the execution of the scheduled job based on the status (e.g. timeliness) of the data set.

Figure 6:
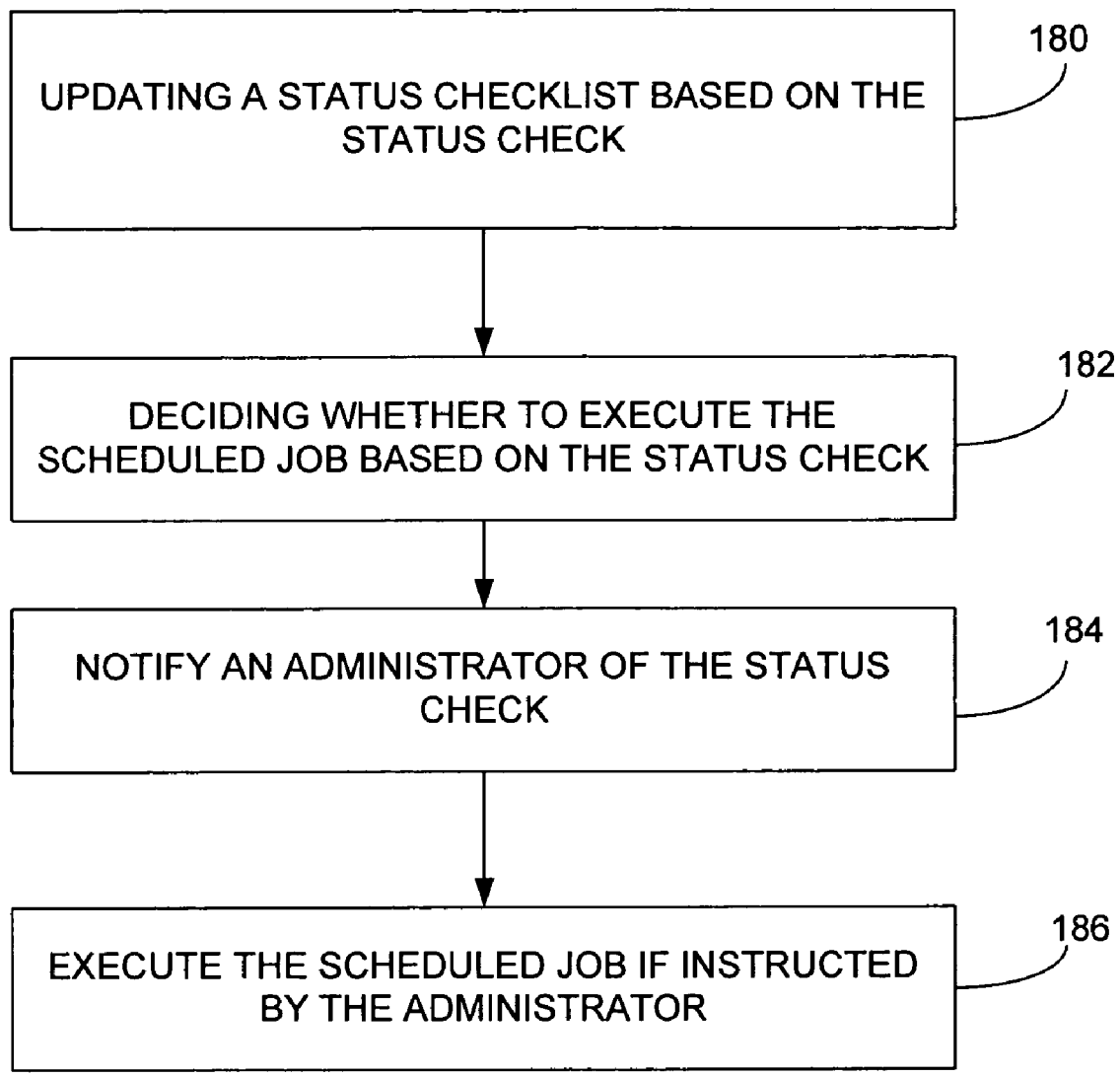
FIG. 6 illustrates the steps of another embodiment of a method for managing the execution of scheduled jobs.

FIG. 6 illustrates several steps of one embodiment regarding step 178 of the flowchart of FIG. 5. In one embodiment, controlling the execution of the scheduled job includes the first step, step 180, of updating a status checklist based on the status indicator. This step includes monitoring the status of the data sets and updating the checklist information, such as discussed above with respect to FIGS. 2 and 4.

The next step, step 182, is determining whether to execute the scheduled job based on the checklist. This decision may be based on the status indicators for each of the data sets. For example, if the data sets are all current for the scheduled job, the decision may be made to continue with the job execution. If one of the data sets is not current, the decision may be to seek means to prevent the improper execution of the scheduled job.

For example, the method proceeds to step 184 wherein an administrator or other system end user may be notified of the potential problem. This notification may be an electronic mail message, an SMS, a page, or any other type of notification. In one embodiment, the notification may also contain a recommendation, such as a recommendation to delay the execution of the scheduled job for a certain period of time. The final step in one embodiment of controlling the execution of the scheduled job, step 186, is to execute the scheduled job if instructed, such as by the end user, administrator, internal predefined rules or any other means recognized by one having ordinary skill in the art. Various embodiments may be utilized, for example a default setting may be used wherein if a response to a notification is not received within a period of time, the job is automatically executed or postponed. In another embodiment, factors may be established for automating the decision based on the status of different types of data sets.

In the management of the execution of the scheduled jobs, the management device 104 monitors the status of the data sets used by the processing device 102 to execute the scheduled jobs. Based on monitoring the data sets, the management device 104 can manage the execution of the scheduled jobs, avoiding the execution of scheduled job having inaccurate data and therefore preventing the re-running of the job at a later time, wasting computing resources.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus, comprising:
   a processor for executing a scheduled job based on a data set generated by and received from a remote system; and
   a scheduled job management device operative to:
   identify the data set upon which the scheduled job is to operate, and receive a status indicator associated with the data set from the remote system;
   determine whether the status indicator indicates that the identified data set has been classified as current and complete by the remote system;
   update a status checklist based on the status indicator;
   if the data set has been classified as current and complete, instruct the processor to proceed with executing of the scheduled job; and
   if the data set has not been classified as current and complete, send a notification to an end user regarding a status of the data set and instruct the processor to proceed with executing of the scheduled job if so instructed by the end user.

2. The apparatus of claim 1 wherein the management device queries the remote system for the status indicator.

3. The apparatus of claim 1 wherein the notification includes a recommendation regarding the execution of the scheduled job.

4. The apparatus of claim 1 further comprising:
   a checklist database having the status checklist stored therein; and
   wherein the management device is operative to receive the status checklist from the database such that the management device updates the checklist based on the status indicator.

5. A method, comprising:
   identifying a data set generated by a remote system, upon which a scheduled job is to operate, and receiving a status indicator associated with the data set from the remote system;
   determining whether the status indicator indicates that the identified data set has been classified as current and complete by the remote system;
   updating a status checklist based on the status indicator;
   if the data set has been classified as current and complete, instructing a processor to proceed with executing the scheduled job;
   if the data set has not been classified as current and complete, sending a notification to an end user regarding a status of the data set and instructing the processor to proceed with executing of the scheduled job if so instructed by the end user.

6. The method of claim 5 wherein the notification includes a recommendation regarding the execution of the scheduled job.

7. The method of claim 5 further comprising:
   loading the status checklist; and
   updating the checklist based on the status indicator.

8. The method of claim 5 further comprising:
   querying the remote system for the status indicator.

9. The method of claim 5, wherein the status indicator indicates whether the remote system validates that it has generated the data set within a predetermined time period.

10. The method of claim 5, further comprising:
    if the status indicator indicates that the data set has not been classified as current and complete by the remote system, sending a message to a user requesting instruction whether to execute the scheduled job or wait until the data set has been classified as current and complete.

11. A method, comprising:
    identifying a data set generated by a remote system, upon which a scheduled job is to operate, and a status indicator associated with the data set;
    determining whether the status indicator indicates that the identified data set has been classified as current and complete by the remote system;
    if the data set has been classified as current and complete, instructing a processor to proceed with executing the scheduled job; and
    if the data set has not been classified as current and complete, sending a message to a user requesting instruction as to whether to execute the scheduled job or wait until the data set has been classified as current and complete;
    waiting for a response from the user; and
    if no response is received from the user within a predetermined time period, providing a default instruction to the processor regarding executing the scheduled job.

12. The method of claim 11, wherein the default instruction includes an instruction to execute the scheduled job.

13. The method of claim 11, wherein the default instruction includes an instruction to postpone executing the scheduled job.

14. A computer-readable storage medium including program instructions, which when executed perform a method, the method comprising:
    identifying a data set generated by a remote system, upon which a scheduled job is to operate, and receiving a status indicator associated with the data set from the remote system;
    determining whether the status indicator indicates that the identified data set has been classified as current and complete by the remote system;
    updating a status checklist based on the status indicator;
    if the data set has been classified as current and complete, instructing a processor to proceed with executing the scheduled job; and
    if the data set has not been classified as current and complete, sending a notification to an end user regarding a status of the data set and instructing the processor to proceed with executing of the scheduled job if so instructed by the end user.

* * * * *